United States Patent

Meyers

Patent Number: 5,696,371
Date of Patent: Dec. 9, 1997

[54] DIFFRACTIVE/REFRACTIVE LENSLET ARRAY

[75] Inventor: Mark Marshall Meyers, Hamlin, N.Y.

[73] Assignee: Eastman Kodak Company, Rochester, N.Y.

[21] Appl. No.: 652,735

[22] Filed: May 23, 1996

[51] Int. Cl.⁶ .................................................. H01J 40/14
[52] U.S. Cl. .................. 250/208.1; 250/216; 250/237 R; 359/823
[58] Field of Search .................................. 250/208.1, 216, 250/226, 239, 237 R; 359/819, 822, 823; 257/432–433

[56] References Cited

U.S. PATENT DOCUMENTS

| | | |
|---|---|---|
| 3,910,683 | 10/1975 | Nishino et al. . |
| 4,009,939 | 3/1977 | Okano . |
| 4,083,627 | 4/1978 | Okano . |
| 4,093,346 | 6/1978 | Nishino et al. . |
| 4,318,123 | 3/1982 | Knop ........................... 358/43 |
| 4,323,925 | 4/1982 | Abell et al. ................. 358/213 |
| 4,377,753 | 3/1983 | Mir .............................. 250/578 |
| 4,689,291 | 8/1987 | Popovic et al. ............. 430/321 |
| 4,708,436 | 11/1987 | Kleinknecht . |
| 4,733,096 | 3/1988 | Horiguchi .................. 250/578 |
| 4,795,236 | 1/1989 | Ise . |
| 4,878,737 | 11/1989 | Ise . |
| 4,989,959 | 2/1991 | Plummer . |
| 4,994,664 | 2/1991 | Veldkamp ................... 250/216 |
| 4,998,800 | 3/1991 | Nishida et al. . |
| 5,004,901 | 4/1991 | Yoshimoto et al. ........ 250/201.5 |
| 5,029,010 | 7/1991 | Shiraishi .................... 358/225 |
| 5,046,827 | 9/1991 | Frost et al. ................. 359/54 |
| 5,076,687 | 12/1991 | Adelson ...................... 356/4 |
| 5,121,213 | 6/1992 | Nishioka .................... 358/213.11 |
| 5,151,790 | 9/1992 | Takatori et al. ............ 358/225 |
| 5,187,358 | 2/1993 | Setani ......................... 250/208.1 |
| 5,233,174 | 8/1993 | Zmek ......................... 250/201.9 |
| 5,233,431 | 8/1993 | Yoshida et al. ............ 358/227 |
| 5,280,388 | 1/1994 | Okayama et al. .......... 359/569 |
| 5,309,239 | 5/1994 | Bouwhuis ................... 348/265 |
| 5,322,998 | 6/1994 | Jackson ...................... 250/216 |
| 5,324,930 | 6/1994 | Jech, Jr. ..................... 250/216 |
| 5,340,978 | 8/1994 | Rostoker et al. ........... 250/208.1 |
| 5,349,471 | 9/1994 | Morris et al. .............. 359/565 |
| 5,471,515 | 11/1995 | Fossum et al. ............. 377/60 |
| 5,497,269 | 3/1996 | Gal ............................. 359/615 |
| 5,504,621 | 4/1996 | Okayama et al. .......... 359/569 |
| 5,529,936 | 6/1996 | Rostoker .................... 437/2 |
| 5,610,390 | 3/1997 | Miyano ...................... 250/216 |

FOREIGN PATENT DOCUMENTS

Hei 8(1996)-
107194 10/1994 Japan .

OTHER PUBLICATIONS

Proceedings, SPIE—The International Society for Optical Engineering, "International Conference on Applications of Optical Holography," Jun. 5–7, 1995, vol. 2577, pp. 126–129.

Primary Examiner—Que Le
Attorney, Agent, or Firm—Edward Dugas

[57] ABSTRACT

A short focal length image sensor is formed with an array of photosensor sites and a lenslet array. The lenslet array is comprised of a number of abutting lenslets corresponding in number to the number of photosensor sites. Each lenslet has its optical axis decentered as a function of its radial position in the lenslet array so that each lenslet views a different segment of a total field of view. A field limiting baffle, comprised of one or more separated aperture plates, is included with the center of the apertures in each aperture plate being positioned to lie along the optical axis of a respective lenslet.

7 Claims, 5 Drawing Sheets

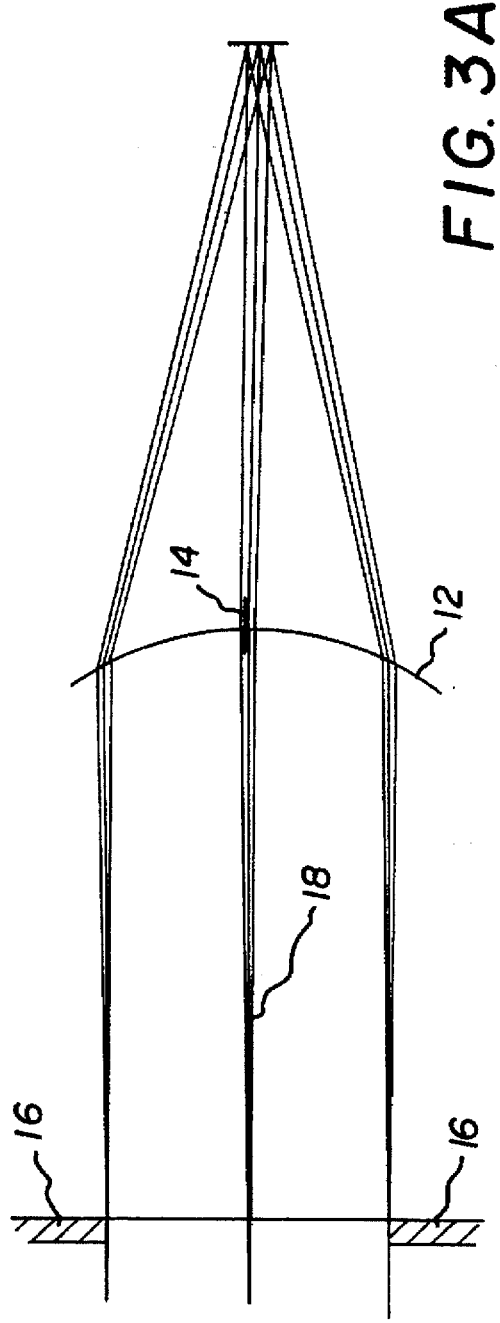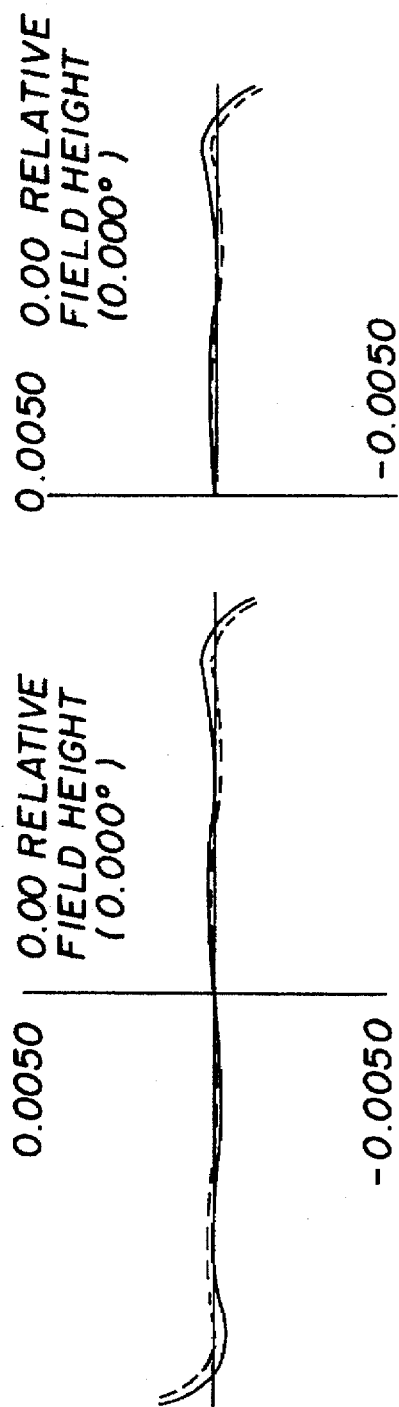

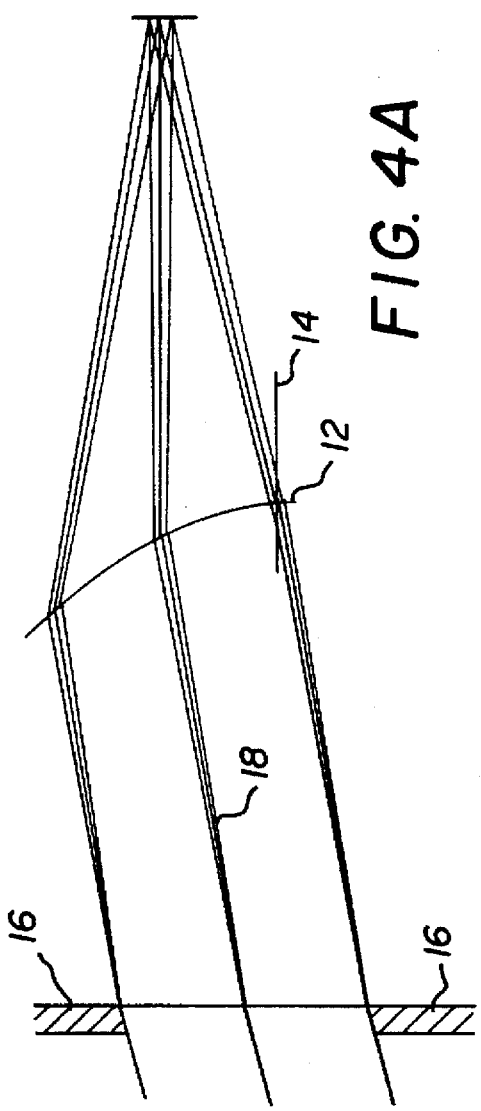
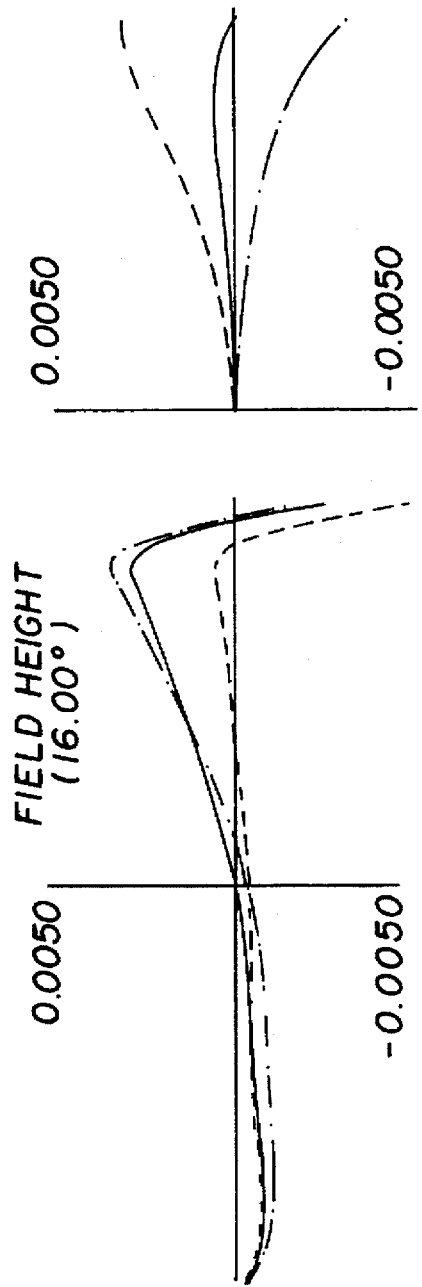

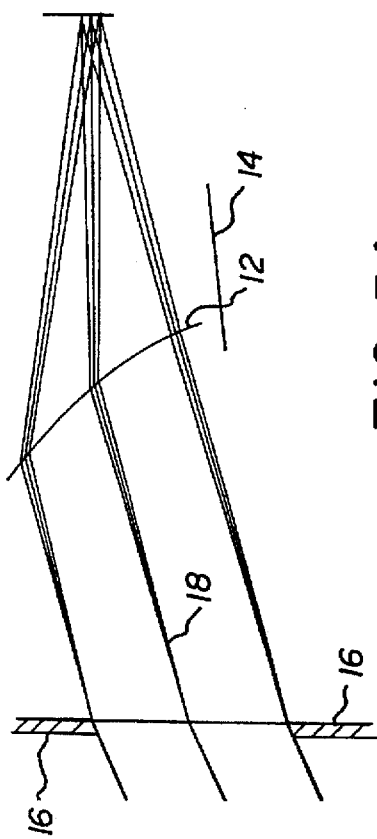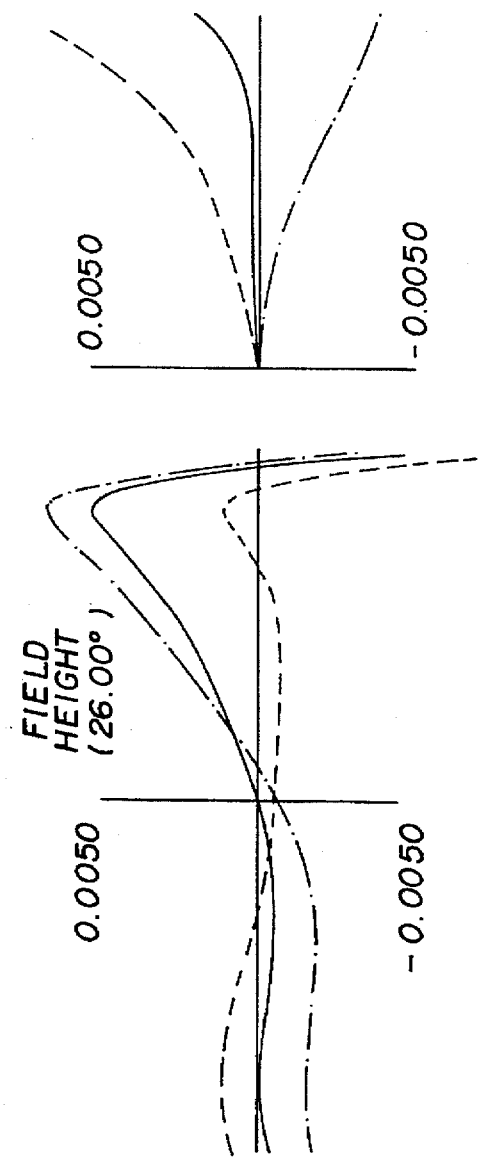

DIFFRACTIVE/REFRACTIVE LENSLET ARRAY

FIELD OF THE INVENTION

The invention is related to the field of image sensors and particularly to the field of digital image sensors utilizing a lenslet array which form an electronic representation of the optical intensity distribution at the focal plane of the lenslet array.

BACKGROUND OF THE INVENTION

The minimum thickness of a camera is limited by the back focal distance of the camera objective. Focusing on digital cameras, it is possible to make digital cameras thinner by using wide angle lenses, but this makes objects appear as a smaller fraction of the field of view than is desired in some instances. There is also a limitation of the lens ½ field angle to be less than 30 to 35 degrees below which it is much easier to correct for field dependent aberrations such as coma, astigmation, lateral color, petzval field curvature and lateral color. This field angle limitation limits how short the focal length of the objective can be and in turn how thin a camera can be. It is the object of the current invention to form a very thin camera using a novel type of array lens photographic objective.

Lenslets arrays have been used concentrate light imaged on the detector plane by a photographic objective into smaller areas to allow more of the incident light to fall on the photosensitive area of the photodetector array and less on insensitive area between the pixels. This has been described in papers such as "Visible Array Detectors" by Timothy J. Tredwell, from HANDBOOK OF OPTICS, VOL. 1, FUNDAMENTALS, TECHNIQUES, & DESIGN, SECOND EDITION, Chapter 22, pp.32–34. These lenslet arrays are centered directly above the corresponding photosensor and are not designed to look at different portions of the field of view independently. Rather, they concentrate the light from an existing image formed by the photographic objective into the pixel aperture.

In U.S. Pat. No. 4,994,664, entitled, "Optically Coupled Focal Plane Arrays Using Lenslets And Multiplexers" by Veldkamp, an array of diffractive lenslets is used to concentrate incident light onto an array of photosensors in order to allow for location of amplifying circuitry in areas between photosensor sites. These lenslets are centered over the photosensitive sites and are formed on the opposite side of the photosensor array on a silicon substrate, (the use of the silicon substrate allows the fabrication of the lenslet array integral with the sensor. This would not allow the use of visible light. The invention does envision the possibility of a separate quartz substrate). However, the invention still would not be able to work over the visible wavelength range since the element is composed of all diffractive optical power and suffers from severe chromatic aberrations.

In U.S. Pat. No. 5,233,174, entitled, "Wavefront Sensor Having A Lenslet Array As A Null Corrector" by Zmek, an array of diffractive lenslets with decenters which are adjusted to eliminate the local monochromatic wavefront tilt from a specific optic under test in an interferometric or Hartman type test. A Hartman test is used to certify the surface quality of various optics. If the optics under test falls within the acceptance criteria the wavefront incident on the sensor array will form centered light spots on predetermined pixels. If the wavefront is other than the desired wavefront the light spots will be incident on different pixel elements. This invention is not applicable to the current application since the centered lenslets are not looking at regularly spaced sections of a predetermined field of view. It is also not applicable to white light applications due to the chromatic aberrations of the diffractive lenslets.

U.S. Pat. No. 5,340,978, entitled, "Image-Sensing Display With LCD Display Panel And Photosensitive Element Array" Rostoker et al., briefly describes an array of decentered lenses which form an image of a segment of the field of view is described. These lenses are widely separated and do not include a workable method for limiting a field of view seen by an individual pixel. Light from outside the desired field of view can be incident on the photosensor by scattering off the walls of a spacer element or by reflection and reimaging of light within the array substrate. The wide separation of the lenslets in the array limits the amount of light which can be gathered and focused on the image sensor. The use of the widely separated pixels will greatly increase costs of the sensor since there will be fewer sensor arrays fabricated on a given size substrate or wafer. In addition, the larger sensor array size will cause a decreased yield of finished sensor arrays for a given manufacturing process. Also there is no discussion of the trade-off between the focal length of the lens array and the angular subtense of the pixels field of view. If the focal length of the lenslets is to short light from one part of the field of view which is incident on one pixel will also be within the field of view of an adjacent pixel. For very short focal lengths the corresponding pixel dimension required for an equivalent angular resolution will be so small as to not be able to be fabricated with lithographic processes. In addition, the light gathering area of the pixel will be so small as to not generate a reliably measurable number of electrons for a given incident intensity. There is no discussion of the use of diffractive/refractive hybrids for achromatization. This patent assumes the use of an array of uniformly shaped lenslets while in the present invention the utility of varying the surface profile of the lenslets as a function of their radial position in the lenslet array allows for a higher level of aberration correction. In the current invention the lenses will be abutted to each other and an opaque baffle placed over the sensor to limit the field of view of each pixel.

SUMMARY OF INVENTION

The present invention is directed to overcoming one or more of the problems set forth above. Briefly summarized, according to one aspect of the present invention, there is provided a short focal length image sensor comprising:

a color photosensor array comprised of number of sets of three photosensors;

a lenslet array comprised of a number of abutting lenslets corresponding in number to the number of sets of three photosensors each lenslet having a decentration corresponding to its radial position in the lenslet array so that each lenslet views a different segment of a total field of view; and a field limiting baffle comprised of at least one aperture plate which may be a lenslet aperture stop where the center of the apertures are each positioned to lie along the optical axis of a respective lenslet optical axis.

From the aforementioned it can be seen that it is a preferred object of the present invention to provide an image sensor with a wide field of view and a short back focal distance.

It is another object of the present invention to provide a compact semiconductor image sensor assembly that is easy to fabricate and that enables the design and manufacture of cameras thinner than heretofore possible.

These and other aspects, objects, features, and advantages of the present invention will be more clearly understood and appreciated from a review of the following detailed description of the preferred embodiments and appended claims, and by reference to the accompanying drawings.

Advantageous Effect of the Invention

The present invention has the following advantages:

The integrated lenslet array sensor is compact and portable due to its reduced lens backfocus which permits its use in very thin camera bodies;

The integrated lenslet array sensors are easy to fabricate with minimum critical alignments of parts in that multiple integrated sensor arrays on a semiconductor wafer may be simultaneously aligned with multiple lenslet arrays before dicing of the wafer;

BRIEF DESCRIPTION OF THE DRAWINGS

FIGS. 3A, 3B, and 3C, illustrates in cross section a central lenslet, and the associated tangential and saggital ray aberration curves, respectively;

FIGS. 4A, 4B, and 4C, illustrate in cross section a lenslet at a 16 degree field angle, and the associated tangential and saggital ray aberration curves, respectively; and FIGS. 5A, 5B, and 5C, illustrate in cross section a lenslet at a 26 degree field angle, and the associated tangential and saggital ray aberration curves, respectively.

To facilitate understanding, identical reference numerals have been used, where possible, to designate identical elements that are common to the figures.

DETAILED DESCRIPTION OF THE INVENTION

Figure 1:
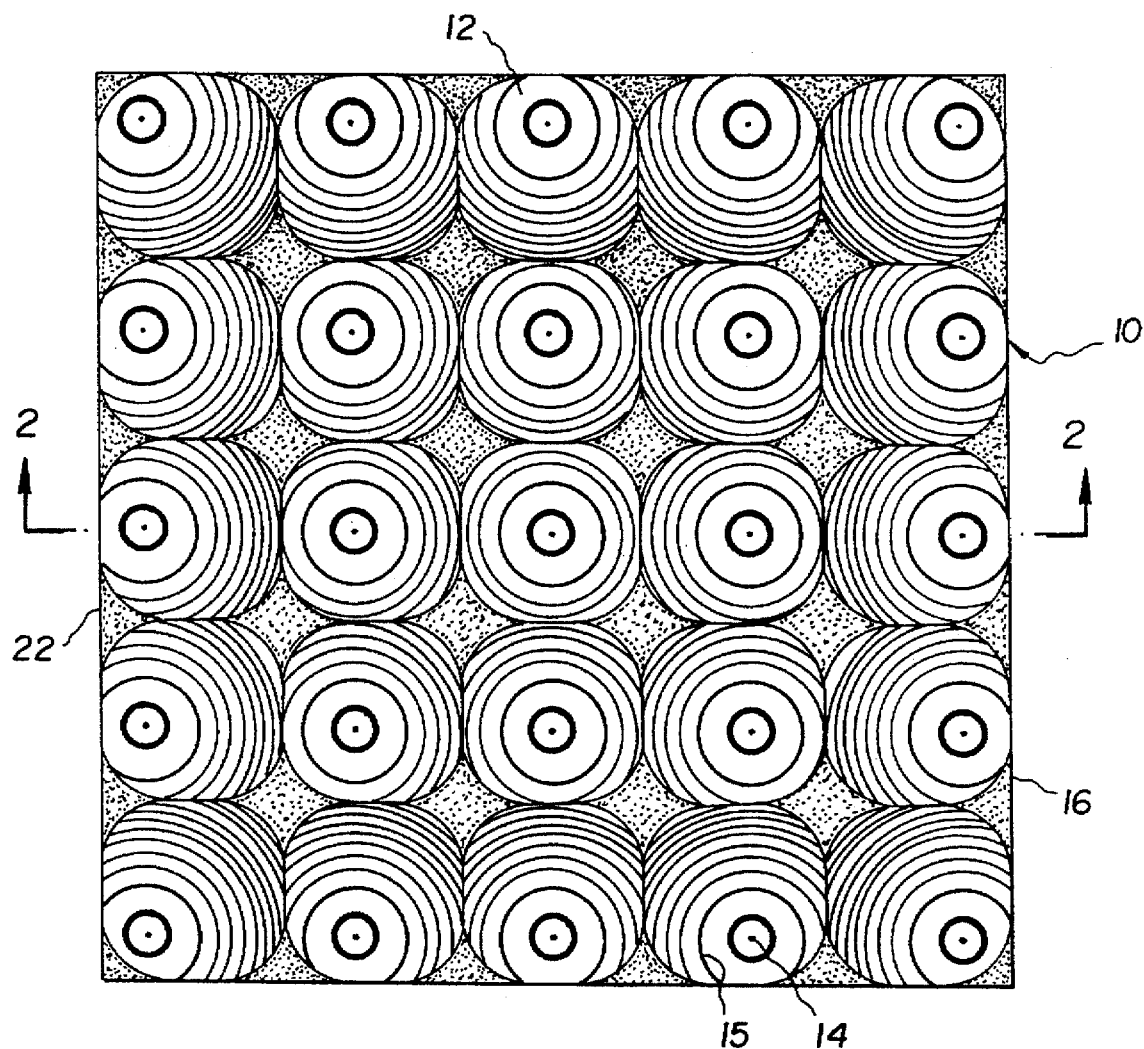
FIG. 1 is a top view of lens contours and baffles for the lens array of the present invention.
Figure 2:
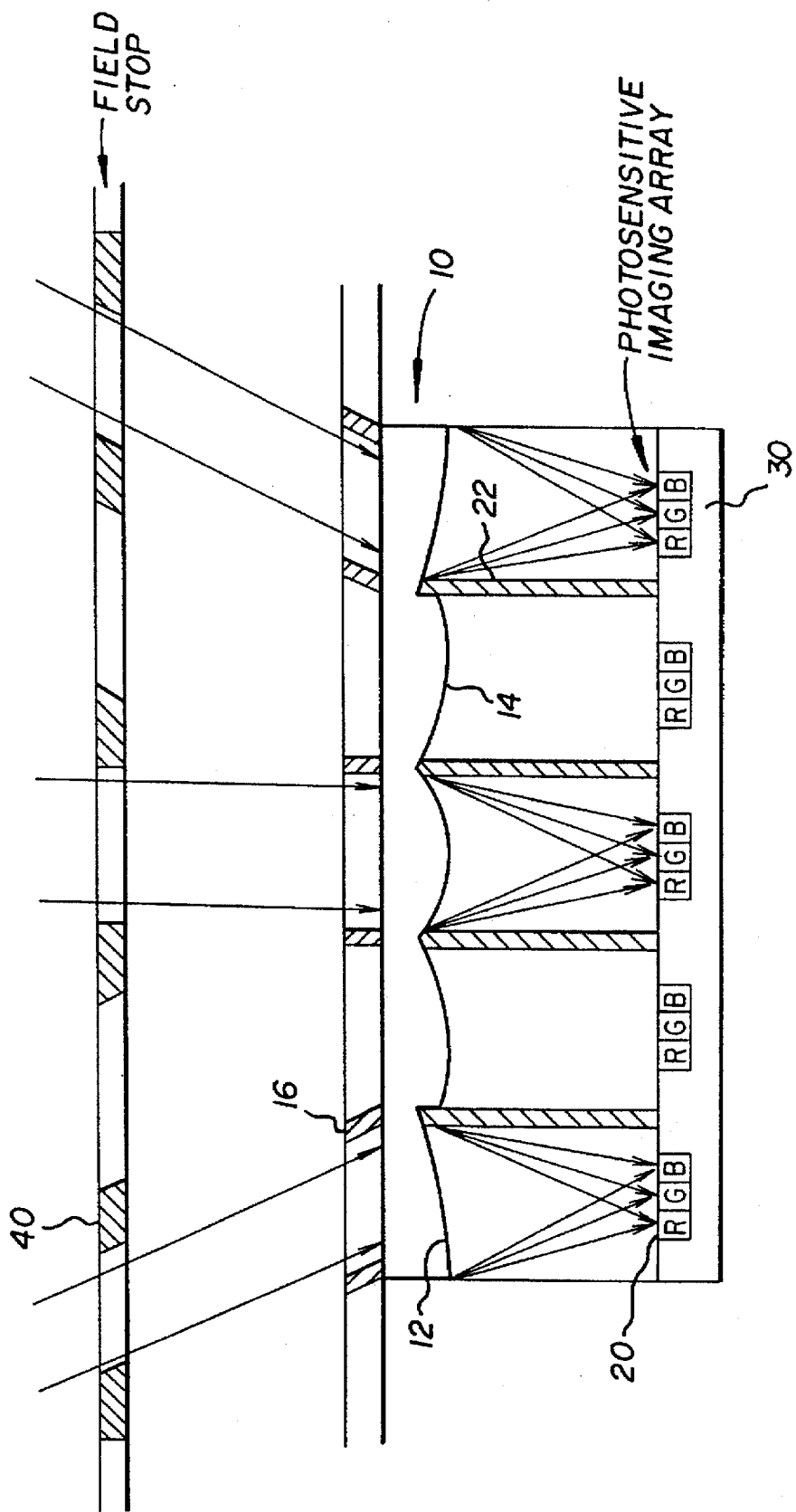
FIG. 2 is a sectioned view taken along the section lines 2—2 of the lens array of FIG. 1.

Referring to FIG. 1, a lenslet array 10 is formed with an array of achromatized refractive/diffractive lenslets 12 or refractive lenslets which are centered over photosensitive sites 20 (shown more clearly in FIG. 2). To be observed in this figure is that the center of the mechanical optical axis 14 of each lenslet 12 is displaced relative to the fixed sensor to sensor distance as a function of its radial distance from the optical axis of the central lenslet. The lines 15 appearing around the mechanical optical axis 14 of each lenslet 12 are topographical lines indicating changes in height of the lenslet's surface. An opaque mask 16 fills the areas between the lenslets 12 to prevent light from reaching the sensor that will be discussed with respect to FIG. 2. The array depicted in FIG. 1 represents only a small portion of an array that will be used in an actual camera. In an actual implementation approximately 780×640 lenslets are used to form the array. Other configurations of the lenslets may be used such as forming the outer periphery of each lenslet as a square, hexagon, or circle, without detracting from the invention.

In order for the array to see different fields of view the optical axis of the lenslets in the lens array are located at a distance which becomes progressively larger than the center-to-center distance of the pixels in the array. The displacement of the lenslets optical axis increases radially from the center of the array. Decentering a lens element tends to bend rays from off-axis field angles into the center of the lens groups field of view. By moving the optical axis of the lens element further out radially with increasing distance from the center of the array, the angular location of object at the center of the field of view for a given lenslet/photodetector pair originates from increasingly off-axis segments of the total field of view (see FIG. 2).

For instance, the required decenter for an array element of focal length $FL_i$ necessary to deflect the ray from the desired field angle into the center of the array element's field stop can be determined from the paraxial ray tracing equations. The paraxial equations are $$y'=y_o-nu(t/n)$$

$$n'u'=n_o u_o-y\phi$$

where
y'=height after propagation to next surface
$y_o$=height at previous surface
u=paraxial slope angle (radians)
$u_o$=slope angle before refraction
$\phi$=power of array element ($\phi=1/FL_i$)
n=refractive index of the medium Therefore, the displacement for a given lenslet with power $\phi$ ($=1/FL_i$) that is necessary to bend the central ray from a given angle of incidence $u_o$ to a desired angle u', after refraction is given by $$d=y=(n_o u_o-n'u')f$$

The invention utilizes an array of lenslets where the local displacement of the lens group's optical axis varies as a function of radial position relative to the center of the system's image optical axis, so that, to first order $$d(r)=(n_o u_o(r)-n'u'(r))f$$

The invention consists of adjusting the lenslet decenters so that u'(r)=0 for the central ray within a given lenslet's field of view (see FIG. 2). In this case the decenter necessary for a given element is approximately a linear function of the element's radial distance from the system's optical axis.

Referring now to FIG. 2, the lenslet array 10 is positioned over a photosensitive imaging array 30 that may be a CCD array having a number of photosensitive sites 20 corresponding in number to at least the number of lenslets forming the lenslet array 10. In a three color environment up to three photosensitive sites would be formed under each corresponding lenslet. The lens array is maintained a distance apart from the surfaces of the photosensors by spacers 22 that may also serve the function of being baffles. Opaque baffles 16 on the lenslet array 10 combined with a field stop aperture plate 40 to limit the field of view of any particular photosensor so that it does not overlap the field of view of it neighbors by a large amount. The aperture plate 40 is positioned approximately 0.5 mm to 2 mm from the surface of the lenslet array 10. The aperture plate 40 may be a layer of clear glass having a photoresist mask pattern formed on one of it's surfaces.

The center of the apertures in the aperture plate 40 are aligned to the center of the field of view of a corresponding lenslet. The spacing of the centers increases as a function of each lenslet's radial position radially from the center of the array causing the aperture plate to be slightly larger than the associated lens array. The combination of the opaque areas 16 with the aperture plate 40 and a given lenslet focal length determines the field of view for a photosensitive site 20. The lenslet array 10 can be formed of etched quartz, or an epoxy replica on a glass substrate.

The lenslets 12, combined with the appropriate field stop aperture plate 40, form images of a small segment of the field of view on each photosensitive site 20. By forming the lenslets 12 with decentrations of the mechanical optical axis 14 which increase radially across the CCD array the angle which the axial ray incident on any particular CCD element makes with the surface normal of the CCD will increase as a function of radial position on the array. Therefore, by appropriately adjusting the decenters of each lenslet each CCD pixel will view a different segment of the scene without the need for a separate lens. Since each CCD pixel has its own lens element there is no need to reinvert the image with a relay lens. Therefore, any camera system incorporating the present invention can be extremely compact and flat. The camera can work in black and white or in color if three pixels with color filters are formed on each pixel are used.

An array of aspheric lenslets can be used to form images on the detector array. However, the aforementioned embodiment does not correct for the variation in focal length as a function of wavelength since the lens element is formed from a single refractive material, therefore the spot size of the incident light varies as a function of color. An improved optical design including a diffractive/refractive hybrid lens is used to correct the chromatic aberration in a single material.

The imaging properties of diffractive optics are strongly wavelength dependent. When modeling a diffractive optic this phenomena can be represented as a direct dependence of equivalent refractive index on wavelength:

$$n(\lambda) = [\lambda_c/\lambda](n_c - 1) + 1$$

Diffractive elements impart all of their wavefront bending in an extremely thin layer. This is accounted for in the Sweat model by modeling the diffractive as a very high index material ($n_c = 10,000$) with very low curvatures (weak surfaces) on each surface. The corresponding focal length can then be determined from:

$$f(\lambda) = [n(\lambda) - 1]\Delta c$$

so that $$f(\lambda) = (\lambda_c/\lambda) f_c$$

where $\lambda_c$ = design center wavelength

The resultant dispersion $v_{diff}$ of the diffractive element is:

$$v_{diff} = \frac{n(\lambda_c) - 1}{n(\lambda_S) - n(\lambda_L)}$$

which reduces to:

$$v_{diff} = \frac{\lambda_c}{\lambda_S - \lambda_L}$$

For designs using:
$\lambda_c$=587 nm
$\lambda_S$=486 nm $v_d$=−3.5
$\lambda_L$=656 nm For other wavelength bands of interest an appropriate $v_{diff}$ and element power distribution can be calculated. The direct dependence of the equivalent refractive index on wavelength leads to a small, negative, $v_{diff}$ and a high level of wavelength dispersion associated with a first order (m=1) diffractive optical element.

Due to the variation of refractive index with wavelength, a single element lens has a variation of focal length with wavelength. Two materials with different dispersions can be used to form a doublet lens which has the same focal length at two wavelengths and reduced variation over the whole spectrum. The relative distribution of focal powers required to achieve this is given by $$\phi_{ref} = \frac{v_{ref} * \phi_{total}}{v_{ref} - v_{diff}}$$

$$\phi_{diff} = \frac{v_{diff} * \phi_{total}}{v_{diff} - v_{ref}}$$

The negative $v_{diff}$ of the diffractive surface allows for achromatization of single element hybrid refractive/diffractive lenses utilizing a positive focal length diffractive and refractive component. It also decreases the focal length and F/# required of the doublet component lenses because a refractive doublet consists of a positive crown (low dispersion) lens with a shorter focal length and smaller F/# than is required for a singlet and a negative flint element which increases the doublet focal length to the correct value and compensates for the dispersion of the positive lens. This effect also decreases the size and weight of the positive element of a hybrid refractive/diffractive element.

For traditional achromatization in the visible regime (d-e-f lines) with PMMA plastic lenses the fraction of power in the refractive and diffractive portions would be $$\phi_{ref}/\phi_{total} = 94.25\%$$

$$\phi_{diff}/\phi_{total} = 5.75\%$$

It is obvious to a person skilled in the art that one can utilize substrates such a quartz, or optical glasses such as BK7, or utilize epoxy replicas on glass substrates.

The use of diffractive/refractive hybrid achromatization enables the use of diffractive surfaces with longer focal lengths and higher F/#'s. The high F/# makes the diffractive element easier to manufacture due to the large zone spacings. For instance, for a lens with a FL=0.5 mm and a F/#=2.0 the first order analysis of the refractive and diffractive portions would provide focal lengths and F/#'s of $f_{ref}$=0.531 mm F/#=2.12
$f_{diff}$=8.696 mm F/#=34.8

Assuming the diffractive portion of the lenslet was used purely for first order chromatic correction.

The diffractive lenslets 12 are shown in FIGS. 3A, 4A, and 5A, for the on-axis, 16 degrees, and full field of view. To be noted in a comparison of these figs is that the mechanical optical axis 14 is moving radially outwards as a function of field angle while the local optical axis 18 is incident normal to the plane of the photodetector array.

The opaque baffle 16 acts as the aperture stop for the system as well as limiting the field of view of a given photosensor FIGS. 3B through 5C represent the tangential an saggital ray aberration curves for their respective lenslets. It is noteworthy that the overall spot size including chromatic aberration is approximately 10 microns which is a typical photodetector size. The solid lines represent a wavelength of 546.1 nm, the dotted lines represent a wavelength of 656.1 nm, and the dotted and dashed lines represent a wavelength of 460.0 nm which represent light in the green, red, and blue, wavelengths.

The following table lists the optical design parameters for three array elements at 0, 16, and 26 degrees. The array elements at the intermediate field angles can be interpolated from these values.

Example A

0 Degree Field Lens
EFL = 0.5 mm
F/# = 2.0

| Surface No. | Radius | Thickness | Glass | |
|---|---|---|---|---|
| Object | | Infinity | Air | |
| 1 Aperture Stop | | 0.5 | BK7 | |
| 2 | −0.273 | 0.496 | Air | |
| Aspheric Coeff. | AD = 1.206 × 10$^1$ | | Diffractive Coeff. | DF3 = −4.9 × 10$^{-2}$ |
| | AE = 2.525 × 10$^2$ | | | DF5 = −5.0 × 10$^{-2}$ |
| | AF = −6.122 × 10$^3$ | | | |
| | AG = −1.046 × 10$^5$ | | Element Decenter | DC = 0.0 |
| Image | | | Air | |

Example B

16 Degree Field Lens
EFL=0.5 mm
F/#=2.0

| Surface No. | Radius | Thickness | Glass | |
|---|---|---|---|---|
| Object | | Infinity | Air | |
| 1 Aperture Stop | | 0.5 | BK7 | |
| 2 | −0.267 | 0.483 | Air | |
| 2 Aspheric Coeff. | κ = −0.115 | | Diffractive Coeff. | DF3 = −1.67 × 10$^{-2}$ |
| | AD = −1.841 | | | DF5 = −2.7 × 10$^{-2}$ |
| | AE = 3.950 × 10$^2$ | | | DF10 = 3.436 |
| | AF = −5.614 × 10$^3$ | | | DF14 = −9.7 × 10$^{-1}$ |
| | AG = 4.381 × 10$^4$ | | | DF21 = −5.2 × 10$^1$ |
| | | | Element Decenter | DC = −0.047 |
| Image | | | Air | |

Example C

26 Degree Field Lens
EFL=0.5 mm
F/#=2.0

| Surface No. | Radius | Thickness | Glass | |
|---|---|---|---|---|
| Object | | Infinity | Air | |
| 1 Aperture Stop | | 0.5 | BK7 | |
| 2 | −0.241 | 0.391 | Air | |
| Aspheric Coeff. | κ = −0.3925 | | Diffractive Coeff. | DFB = 1.86 × 10$^{-2}$ |
| | AD = −1.872 | | | DF5 = 7.42 × 10$^{-2}$ |
| | AE = 7.218 × 10$^2$ | | | DF10 = 3.508 |
| | AF = −8.107 × 10$^3$ | | | DF14 = −3.054 |
| | AG = 4.222 × 10$^4$ | | | DF21 = 1.7 × 10$^1$ |
| | | | Element Decenter | DC = −0.056 |
| Image | | | Air | | where the aspheric surface profile is defined by $$z(r) = \frac{cv\, r^2}{1 + \sqrt{1 - (k+1)cv^2 r^2}} + AD\, r^4 + AE\, r^6 + AF\, r^8 + AG\, r^{10}$$

the diffractive phase profile is defined as $$\phi(r) = \frac{2\pi}{\lambda_0}(DF_3\, x^2 + DF_5\, y^2 + DF_{10}\, x^4 + DF_{14}\, y^4 + DF_{21}\, x^6)$$

where
$\lambda_0 = 546.1$ nm

The invention has been described with reference to a preferred embodiment. However, it will be appreciated that variations and modifications can be effected by a person of ordinary skill in the art without departing from the scope of the invention.

PARTS LIST:
10 lenslet array
12 lenslets
14 mechanical optical axis
15 lines
16 opaque baffles
18 local optical axis
20 photosensitive sites
22 spacers
30 photosensitive imaging array
40 field stop aperture plate

I claim:

1. A short focal length image sensor comprising:
   a photosensor array comprised of number of photosensors;
   a lenslet array comprised of a number of abutting lenslets corresponding in number to the number of photosensors each lenslet having a decentration corresponding to its radial position in the lenslet array so that each lenslet views a different segment of a total field of view; and
   a field limiting baffle comprised of at least one aperture plate which may be a lenslet aperture stop where the center of the apertures are each positioned to lie along the optical axis of a respective lenslet optical axis.

2. A short focal length image sensor comprising:
   a color photosensor array comprised of number of sets of three photosensors;
   a lenslet array comprised of a number of abutting lenslets corresponding in number to the number of sets of three photosensors each lenslet having a decentration corresponding to its radial position in the lenslet array so that each lenslet views a different segment of a total field of view; and
   a field limiting baffle comprised of at least one aperture plate which may be a lenslet aperture stop where the center of the apertures are each positioned to lie along the optical axis of a respective lenslet optical axis.

3. The short focal length image sensor according to claim 2 wherein said lenslets have an aspherical surface.

4. The short focal length image sensor according to claim 3 wherein said lenslets additionally have an aspherical surface whose profile varies as a function of its radial position in the lenslet array.

5. The short focal length image sensor according to claim 2 and further comprising:
   a plurality of baffles extending between each lenslet and a corresponding set of three photosensors so as to prevent stray light from one lenslet impinging on one or more of the three photosensors in an adjacent set of photosensors.

6. The short focal length image sensor according to claim 2 wherein each of said lenslets has a surface that is a diffractive/refractive hybrid to eliminate chromatic aberration.

7. The short focal length image sensor according to claim 6 wherein said lenslets have a diffractive/refractive surface whose profile varies as a function of it radial position in the lenslet array.

* * * * *